United States Patent [19]

Yokoyama et al.

[11] Patent Number: 4,791,267

[45] Date of Patent: Dec. 13, 1988

[54] METHOD OF FORMING IDENTIFYING INDICIUM ON CATHODE RAY TUBES

[75] Inventors: Keishi Yokoyama, Tokyo; Mitsuru Matsushita, Nagaokakyo; Tetsuya Ohtsuka, Tokyo; Yuji Okazaki, Nagaokakyo, all of Japan

[73] Assignee: Mitsubishi Denki Kabushiki Kaisha, Tokyo, Japan

[21] Appl. No.: 148,949

[22] Filed: Jan. 27, 1988

[30] Foreign Application Priority Data

Jan. 28, 1987 [JP] Japan .................................. 62-19001
Dec. 9, 1987 [JP] Japan ................................ 62-312796

[51] Int. Cl.[4] .............................................. B23K 26/00

[52] U.S. Cl. ............................. 219/121.69; 346/76 L; 427/53.1

[58] Field of Search .................. 219/121 EK, 121 EJ, 219/121 LM, 121 G, 121 LQ, 121 LH, 121 LJ, 121 LB, 121 LA, 121 LE, 121 LF; 346/76 L; 427/53.1

[56] References Cited

U.S. PATENT DOCUMENTS 4,323,755 4/1982 Nierenberg .................. 219/121 LJ

FOREIGN PATENT DOCUMENTS 55-155450 12/1980 Japan .
60-81744 5/1985 Japan .

*Primary Examiner*—C. L. Albritton
*Attorney, Agent, or Firm*—Birch, Stewart, Kolasch & Birch

[57] ABSTRACT

A method for forming an identifying indicia on a cathode ray tube being manufactured, which method is practiced by applying a paint containing a powdered metal to a particular exterior surface portion of a glass envelope, forming a part of the cathode ray tube, to form a solid paint layer, followed by the radiation of a laser beam onto at least a portion of the solid paint layer to form the identifying indicia represented by at least one trace of plasticized deformation on a surface region of the solid paint layer.

8 Claims, 5 Drawing Sheets

(X750. AS VIEWED AT AN ANGLE OF DEPRESSION OF 10°.)

(X750. AS VIEWED AT AN ANGLE OF DEPRESSION OF 10°.)

| Heating Temp. | 150°c | 200°c | 250°c | 300°c | 350°c | 400°c | 500°c |
|---|---|---|---|---|---|---|---|
| Contrast | × | × | × | △ | △○ | ○ | ○ |

× : Little Color Change Occurred
△ : Somewhat Color Change Occurred
○ : Color Change Observed

METHOD OF FORMING IDENTIFYING INDICIUM ON CATHODE RAY TUBES

BACKGROUND OF THE INVENTION 1. (Field of the Invention)

The present invention generally relates to the facilitation of fabrication of cathode ray tubes or similar products and, more particularly, to a method of forming on cathode ray tubes respective identifying indicium which provide readable information used to control the production and/or stock administration of the cathode ray tubes.

2. (Description of the Prior Art)

In most automated production lines, the use is made of an automatic production identifying system for automatically identifying the type, model, lot number, serial number and/or any other characteristics of products being assembled or inspected. To facilitate this automatic product identification, one method now widely practiced is that products are applied with adhesive tags each bearing an identifying indicia so printed thereon as to be read by an automatic code reader. The indicia includes, for example, a unique bar code or any other marking and represents readable information peculiar to the particular product being made, for example, the type, model, lot number, serial number and/or characteristic of the particular product being made.

When it comes to the manufacture of fabrication of cathode ray tubes, the production line includes several heat treating stations and several chemical treating stations through which cathode ray tubes being manufactured are transferred in specific sequence. The presence of the heat and chemical treating stations in the production line makes it difficult to use the adhesive tags of the above described type on the cathode ray tubes.

However, any one of the Japanese Laid-open Patent Publications No. 55-155450, published in 1980, and No. 60-81744 published in 1985 discloses a method of forming that identifying indicia on a glass envelope or enclosure of each cathode ray tube which exhibits excellent resistance to both heat and chemicals. Specifically, according to the first-mentioned publication, the identifying indicia is in the form of a bar code formed by the use of a carving technique, that is, in the form of a bar code carved on a particular portion of the glass envelope of the cathode ray tube. On the other hand, according to the second-mentioned publication, the identifying indicia is in the form of a bar code formed by the use of a heat resistant marking agent such as a colored frit, which code is imprinted on a particular side portion of the glass envelope of the cathode ray tube. In both of these publications, the identifying indicia is adapted to be read by an optical or magnetic code identifier.

Apart from the disclosure made in any one of the above mentioned publications, attempts have been made to form, on a portion of the glass envelope of the cathode ray tube, a predetermined pattern of traces of fusion by the use of a high density energy radiator such as a laser, so that an optical code identifier can read such pattern of traces of fusion.

It has, however, been found that all of the above discussed prior art methods have their own problems. More specifically, where the heat resistant marking agent such as the colored frit is employed to form the identifying code on each cathode ray tube, the actual formation of the identifying code on the cathode ray tube relies only on the employment of a printing technique or a stencil printing technique and, therefore, much difficulty has been encountered in controlling the amount of the marking agent to be applied. In addition, even though the identifying code has successfully been formed on the cathode ray tube, particularly an intended portion of the glass envelope, the identifying code so formed tends to distort and/or break off, thereby posing a problem in that a high quality and reliable identifying code can not be formed uniformly on all of the cathode ray tubes being manufactured. This problem in turn makes it difficult for the automatic code identifier to read the identifying code properly.

On the other hand, where the identifying code is in the form of either the patterned carvings formed by the use of a cutter, or the patterned traces of fusion formed by the use of a high density energy radiator such as a laser, the identifying code which can eventually give a high ratio of contrast, that is, a high difference in reflectance between radiated and non-radiated portions of the identifying code, can not be formed unless each carving or trace of fusion so formed has a required depth and width. This requirement makes it difficult to form the identifying code that is minute and of a complicated shape.

SUMMARY OF THE INVENTION

Therefore, the present invention has been devised with a view to substantially eliminating the above described problems and disadvantages inherent in the prior art methods and has for its essential object to provide an improved method of forming the identifying indicia, which method is effective to provide each cathode ray tube being manufactured with a respective identifying indicia which is reliable and high in quality and which can exhibit a relatively high resistance to both heat and chemicals.

Another important object of the present invention is to provide an improved identifying indicia forming method of the type referred to above, which is effective to form the identifying indicia that is minute in size and complicated in shape.

To this end, the present invention provides a method for forming an identifying indicia on each cathode ray tube being manufactured, which method is practiced by applying a paint containing a powdered metal to a particular exterior surface portion of a glass envelope, forming a part of the respective cathode ray tube, to form a solid paint layer, followed by the radiation of a laser beam onto the solid paint layer to form the identifying indicia represented by at least one trace of plasticized deformation on a surface region of the solid paint layer.

The metal containing paint utilizable in the practice of the method of the present invention is preferred to be a varnish containing a powder of stainless steel, that is, a mass of fine particles of stainless steel. More specifically, the metal containing paint is preferred to be of a composition containing 30% by weight of varnish of silicone resin as a matrix and 12% by weight of stainless steel powder, the balance being a solvent such as trichloroethane, xylol, trol, butanol or toluene.

Alternatively, use may be made of the composition containing 30% by weight of varnish of silicone resin, 12% by weight of stainless steel powder and 2% by weight of fluorine containing polymer, the balance being the solvent, preferably, trichloroethane, or the composition containing 11.5% by weight of methylphenyl silicone resin, 13% by weight of stainless steel powder, 74.5% by weight of toluene and 1% by weight of butanol.

Other than the silicone resin and methylphenyl silicone resin, a mixture of silicone resin with denatured silicone may be employed for the matrix of the metal containing paint. An inorganic matrix, for example, ceramics such as glass of low melting point generally used in the production of enameled ironwares, may also be used for the metal containing paint.

The metal containing paint used in the practice of the present invention can withstand not only the heat treatment, but also the chemical treatment both generally employed in the process of manufacture of the cathode ray tubes. The solid paint layer formed on that particular exterior surface portion of the glass envelope or glass bulb by applying and, subsequently, solidifying the metal containing paint will, when radiated by a laser beam emitted from a laser radiator, have its surface region undergoing plasticized deformation due to the presence of the powdered metal, thereby presenting a blackened region. The use of the metal containing paint according to the present invention makes it possible to give such a high difference in light reflectance between the laser-radiated portion, that is, the blackened identifying indicia, and a non-radiated portion that the automatic code reader can with no fault read the identifying indicia descriptive of readable information peculiar to the cathode ray tube being manufactured.

Even though the laser radiator is employed in the practice of the method of the present invention, the present invention makes a decisive departure, inter alia, from the prior art method of a similar kind in that the laser beam is radiated onto the solid paint layer, not directly onto the glass envelope such as practiced in the prior art method of the similar kind, and therefore, the practice of the method of the present invention does not require for the resultant trace of plasticized deformation of the surface region to have a great depth and a great width, such as required in the practice of the prior art method, in order to enhance the difference in reflectance between the radiated and non-radiated portions. This brings about an advantage in that the method of the present invention is effective to form an identifying indicia minute in size and complicated in shape.

Moreover, according to the present invention, the laser beam is directed only to the surface region of the solid paint layer on the particular portion of the glass envelope, and therefore, it will not substantially bring about any adverse influence on the remaining portion of the envelope.

Furthermore, since the metal containing paint when applied and dried can firmly stick to that particular portion of the envelope in the form of the solid paint layer, and since the identifying indicia is formed on the surface region of this solid paint layer, the possibility of the resultant identifying indicia being distorted and/or broken off such as frequently observed in the identifying indicia formed with the marking agent according to the prior art method, can be advantageously minimized. This means that the method herein disclosed in accordance with the teachings of the present invention is effective to provide a high quality and reliable identifying indicia on each cathode ray tube being manufactured.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENT

Figure 1:
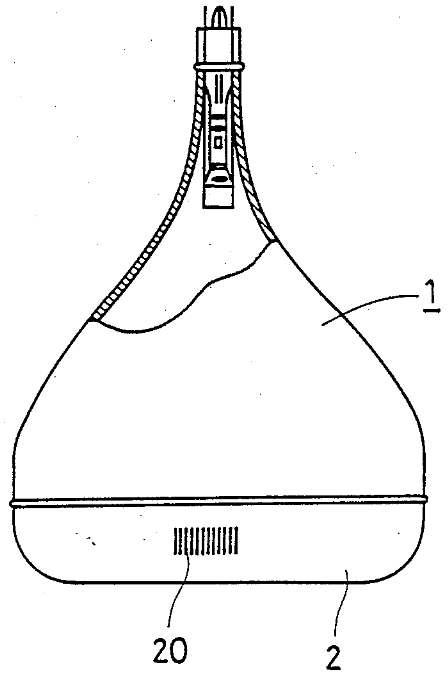
FIG. 1 is a schematic top plan view, with a portion cut away, of a cathode ray tube having an identifying indicia formed thereon according to the present invention.

Referring first to FIG. 1, there is schematically illustrated a cathode ray tube assembly generally identified by 1 and comprising a highly evacuated glass bulb or envelope 2 having a neck section and a cone section, said cone section being flared outwardly from the neck section, one end of the cone section opposite to the neck section being constituted by a faceplate. Reference numeral 20 represents an identifying indicia which is formed on a preselected portion of the envelope 2 and which is shown in the form of a bar code. It is, however, pointed out that any other symbol such as, for example, at least one character or numeral, a set of dots, or a combination thereof, than the illustrated bar code may be employed for the identifying indicia.

Figure 2:
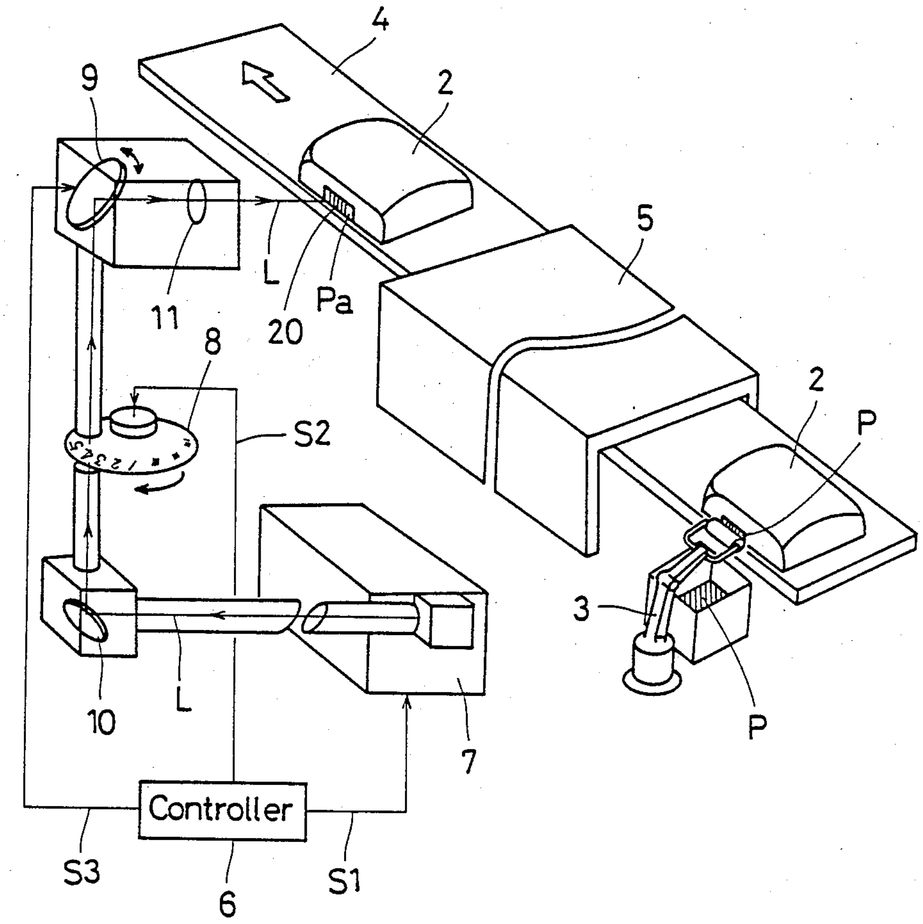
FIG. 2 is a schematic diagram showing a code forming system utilized in the practice of the method according to the present invention.

According to the present invention, the identifying indicia or bar code 20 is formed on that preselected portion of the envelope 2 with the use of a code forming system shown in FIG. 2. As shown in FIG. 2, the system comprises a paint applicator 3 disposed at a paint applying station alongside an intermittently driven conveyor 4 so designed as to successively transport a plurality of cathode ray tubes while they are supported by the conveyor 4 with the respective faceplates of the envelope 2 exposed and oriented upwards as shown. With respect to the direction of transportation of the cathode ray tubes, the paint applying station is followed by a drying station, at which a tunnel-shaped heating furnace 5 is disposed so as to straddle the conveyor 4, and then by a laser marking station.

At the point applying station, a metal containing paint P accommodated in a container is applied by the paint applicator 3 to that preselected portion of the envelope 2 of each of the cathode ray tubes then successively transported by the conveyor 4, the composition of which paint P will be described later.

After the application of the metal containing paint P, the envelope 2 bearing the applied paint is passed through the heating furnace 5 so that the applied paint can be heated for a predetermined time not shorter than 10 minutes at a predetermined temperature within the range of, for example, 300° to 500° C. to form a solid paint layer as indicated by Pa. When the applied paint is dried in this way, the resultant solid paint layer Pa firmly sticks to that preselected portion of the envelope 2 of each of the cathode ray tubes then transported intermitently.

The envelope 2 emerging from the heating furnace 5 is subsequently brought to the laser marking station with the solid paint layer Pa on the associated envelope 2 aligned with the path of travel of a laser beam. Upon the complete positioning of the envelope 2 relative to the path of travel of the laser beam at the laser marking station, a controller 6 is activated to apply a beam oscillating signal S1 to a laser oscillator 7 and also to apply to a rotary mask driver a mask synchronizing signal S2 necessary to align a selected one of character codes, formed on a rotary mask 8, with the path of travel of the laser beam L. At the same time, the controller 6 also applies to a mirror driver an angle control signal S3 necessary to cause an oscillatory mirror 9 to guide and direct the laser beam L, which has passed through the rotary mask 8 and is then deflected by the oscillatory mirror 9, towards a predetermined portion of the solid paint layer Pa on the envelope 2.

As the laser beam L generated from the laser oscillator 7 passes through the desired one of the character codes on the rotary mask 8 after having been deflected by a deflector mirror 10, the laser beam L carries an image of such selected one of the character codes on the rotary mask 8 and then travels towards the predetermined portion of the solid paint layer Pa on the envelope 2 after having been deflected by the oscillatory mirror 9 and having subsequently been passed through a condenser lens 11 operable to converge the imagewise laser beam L.

With this system, the imagewise laser beam L impinging upon the predetermined portion of the solid paint layer Pa on the envelope 2 heats that predetermined portion of the solid paint layer Pa in a pattern corresponding to the shape of the selected character code on the rotary mask 8. As a result of this, only that predetermined portion of the solid paint layer Pa which has been radiated by the laser beam L is burnt black in that pattern corresponding to the shape of the selected character code, thereby completing one cycle of forming the identifying code 20.

It should, however, to be noted that, where the identifying code 20 is comprised of a plurality of code elements, this cycle should be repeated a number of times equal to the number of the code elements, with the rotary mask 8 adjusted appropriately, to complete the formation of the identifying code.

The metal containing paint used in the practice of the method of the present invention is a varnish containing a powder of stainless steel, that is, a mass of fine particles of stainless steel. More specifically, the metal containing paint is of a composition containing 30% by weight of varnish of silicone resin as a matrix and 12% by weight of stainless steel powder, the balance being a solvent such as trichloroethane. The solvent used is nevertheless evaporated during the drying of the applied paint layer to form the solid paint layer inside the heating furnace 5.

With respect to the laser oscillator 7, the use of TEA-$CO_2$ (Transversely Excited Atmospheric pressure $CO_2$) laser oscillator is preferred because of its ease in obtaining a high laser output at a high speed. However, provided that the required laser output can be available, YAG (Yttrium Aluminum Garnet) laser oscillator or any other commercially available laser oscillator may be employed. However, in the present preferred embodiment, the bar code 20 comprised of a plurality of parallel bars is formed by the use of the laser oscillator having 4 Joule/$cm^2$ per pulse and capable of generating the laser beam of 10.6 micrometer in wavelength.

Hereinafter, the reason that the solid paint layer Pa is burnt black when radiated by the laser beam L will be discussed. The result of infrared spectral analysis conducted on the blackened area of the solid paint layer Pa, which was radiated by the laser beam L, and the non-blackened areas of the same solid paint layer Pa which was not radiated by the laser beam L has shown that no difference in spectral distribution is found between the blackened and non-blackened areas. This appears to have shown that change in color occurring in the solid paint layer Pa was not the outcome of chemical change in color of the paint matrix of silicone resin. In an effort to find the reason for the change in color in the solid paint layer Pa, an X-ray diffraction was also carried out to the blackened area of the solid paint layer Pa, the result of which has shown the absence of metal oxides anywhere in the solid paint layer Pa. The failure to find out the metal oxides in the solid paint layer Pa appears to have indicated that the change in color was not the outcome of oxidation of the stainless steel particles forming the metal powder.

Figure 3A:
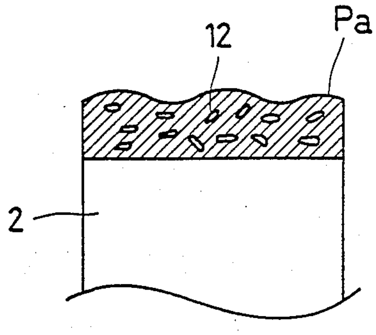
FIG. 3(A) is a schematic sectional representation of a solid paint layer formed on a particular portion of a glass envelope of the cathode ray tube.
Figure 3B:
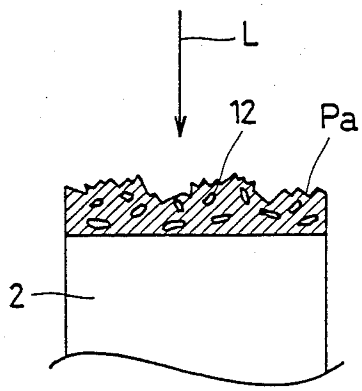
FIG. 3(B) is a diagram similar to FIG. 3(A), showing the solid paint layer which has been radiated with a laser beam.
Figure 4A:
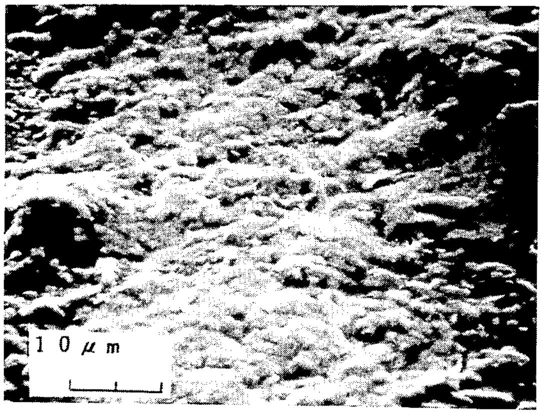
FIG. 4(A) is a microphotograph of an outer surface of the solid paint layer before it is radiated with the laser beam, which microphotograph is obtained with the use of a scanning electron microscope.
Figure 4B:
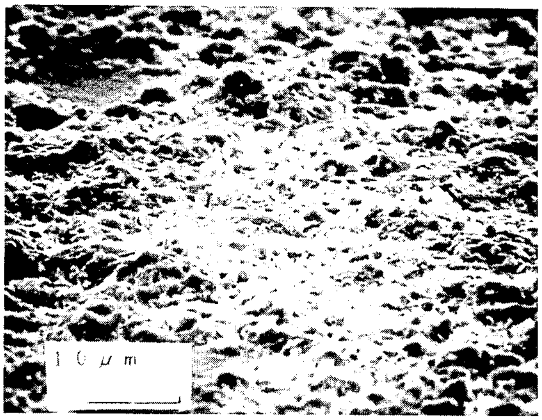
FIG. 4(B) is as microphotograph similar to FIG. 4(A), showing the solid paint layer after it has been radiated with the laser beam.

However, examination made by the use of a scanning electron microscope has shown that the non-blackened area of the solid paint layer Pa has a moderate surface irregularity comprised of smoothly continued peaks and valleys as shown in FIG. 3(A) while the blackened area of the same solid paint layer Pa has a prickling surface irregularity substantially comprised of roughened peaks and valleys as shown in FIG. 3(B). This is evidenced by the microphotographs shown in FIGS. 4(A) and 4(B), respectively, FIG. 4(A) illustrating the surface condition of that portion of the solid paint layer Pa which has not been radiated by the laser beam L, that is, the non-radiated or non-blackened portion of the solid paint layer, whereas FIG. 4(B) illustrates the surface condition of that portion of the same solid paint layer Pa which has been radiated by the laser beam L, that is, the radiated or blackened portion of the solid paint layer.

According to the result of the microscopic examination, a mechanism of blackening of that radiated portion of the solid paint layer Pa could be explained as follows. Starting from the condition as shown in FIG. 3(A), and when the laser beam L is radiated onto the solid paint layer Pa, the stainless steel particles 12 contained in the solid paint layer Pa are generally instantaneously heated. At the same time, a considerable amount of heat is generated from a surface region of the solid paint layer Pa which receives a substantial amount of the laser beam L, the consequence of which is that the surface region of the solid paint layer Pa appears to undergo a plasticized deformation leaving fine surface irregularities. The resultant fine surface irregularities appearing on the surface region of the solid paint layer Pa scatters light as the reflectance exhibited by the surface of the solid paint layer Pa has been lowered, representing a black color. On the other hand, the radiation of the laser beam onto a surface of the paint layer containing no metal powder has resulted in the surface region without being blackened.

In view of the foregoing, the presence of the metal powder 12 in the solid paint layer Pa which has a relatively high reflectance appears to promote the generation of heat from the surface region of the solid paint layer Pa when the latter is radiated by the laser beam L.

Hereinafter, how the metal containing paint P is applied to the envelope in accordance with the method of the present invention as hereinbefore described will be affected when heated will be discussed.

Figures 5, 6:
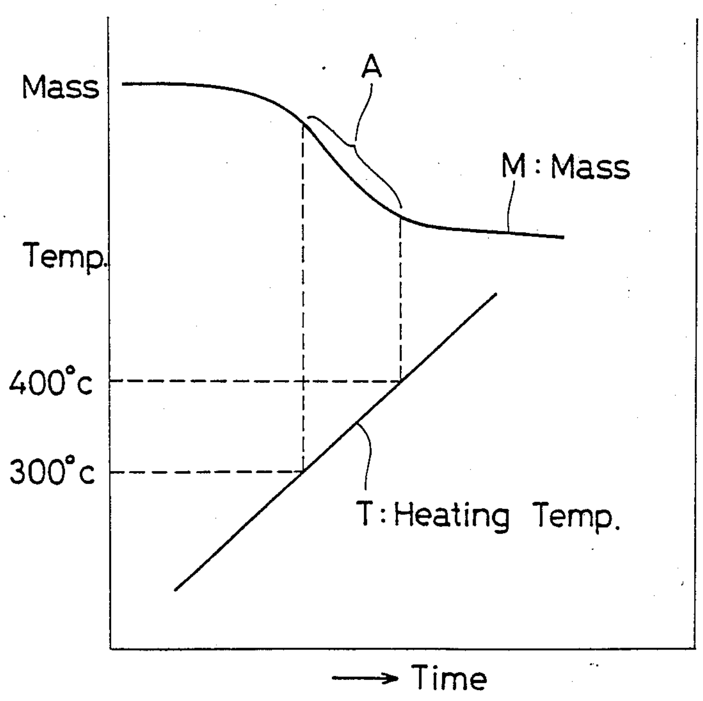
FIG. 5 is a graph showing the relationship between the applied temperature and the contrast exhibited by a marking.
FIG. 6 is a graph illustrating a change in mass of a metal containing paint, used in the practice of the method of the present invention, with the applied temperature.

FIG. 5 illustrates the relationship between the heating temperature used and the contrast of the identifying code formed by the radiation of the laser beam. On the other hand, FIG. 6 illustrates a change in mass M of the solid paint layer Pa with a change in heating temperature T. As can be understood from FIG. 5, the solid paint layer P in the illustrated embodiment will not exhibit a satisfactory contrast unless the heating temperature exceeds 300° C. On the other hand, the graph of FIG. 6 speaks of the fact that, when the heating temperature T is within the range of about 300° to 400° C. as indicated by A, the mass M of the solid paint layer Pa decreases. Considering the table of FIG. 5 and the graph of FIG. 6 together, the reason for the change in contrast of the identifying code occurring with change in heating temperature T can be possibly because, if the heating temperature T is low (for example, if it is lower than 300° C.), the solvent, that is, trichloroethane, contained in the applied paint P remains unremoved and, therefore, a considerable amount of laser energies produced upon the radiation of the laser beam L is consumed to evaporate the solvent, so far from being consumed to color the solid paint layer Pa.

As hereinbefore described, the metal containing paint P contains, inter alia, the silicone resin as a matrix. Therefore, the resultant identifying code 20 made from this metal containing paint P can withstand both the elevated temperature and chemical attacks employed in the course of manufacture of the cathode ray tube, for example, during a preheating (stabilizing) step, a step of forming a black matrix layer, a step of forming a phosphor, a step of vapor-depositing an aluminum film, an annealing (baking) step, a frit sealing step, and a step of mounting an electron gun assembly. Therefore, according to the present invention, the possibility of the identifying code 20 being broken off and/or contaminated can advantageously be minimized.

In addition, the inclusion of the stainless steel powder in the metal containing paint P facilitates the plasticized deformation of the radiated portion of the solid paint layer Pa, when that portion is radiated by the laser beam, enough to permit it to be blackened sufficiently. The blackened portion of the solid paint layer Pa gives a high contrast relative to the non-radiated portion of the same solid paint layer Pa, exhibiting a great difference in reflectance enough to permit the resultant identifying code 20 to be properly read by an optical code reader.

Because of the high contrast exhibited between the radiated and non-radiated portions of the solid paint layer Pa has hereinbefore described, there is no necessity to form traces of plasticized deformation in the surface region of the solid paint layer Pa, which traces have a relatively great depth and a relatively great width. Therefore, the method according to the present invention is effective to form the identifying code 20 that is minute in size and complicated in shape. Moreover, the radiation of the laser beam will not bring about any adverse influence on the envelope 2 and/or any other portion of the cathode ray tube because it is directed only to a portion of the solid paint layer Pa deposited on a selected portion of the envelope 2.

Furthermore, the applied paint P when dried to form the solid paint layer Pa bonds so firmly to the envelope 2 that any possible distortion and/or breakage of the eventual identifying code 20 can advantageously be minimized.

In the practice of the method of the present invention, the use has been made of the heating furnace 5 in which is created a high temperature atmosphere effective to facilitate the solidification of and the subsequent firm bonding of the layer of metal containing paint P deposited on the selected portion of the envelope 2.

The temperature at which the solid paint layer on the envelope is dried and the length of time during which the applied paint is dried to form the solid paint layer may be selected appropriately in consideration of the type of matrix and/or solvent used in the metal containing paint and are, therefore, not limited to those herein disclosed. By way of example, where the solvent is of a kind which can be readily removed by evaporation at a relatively low temperature proximate to a normal temperature or room temperature is employed in the metal containing paint, the paint applicator 3 may be a spray gun and the use of the heating furnace 5 and any drying furnace may be dispensed with although the heating can facilitate the solidification of the metal containing paint used in the practice of the present invention. In other words, where the solvent of the kind referred to above is employed, the heating is not essential in the practice of the method of the present invention and the paint applied to the envelope may be allowed to stand until it solidifies to form the solid paint layer.

With respect to the solvent used in the metal containing paint utilizable in the practice of the present invention, other than trichloroethane, any one of xylol, trol, butanol, toluene or any other solvent may be used, which solvent can be removed by evaporation before or during the heat treatment, that is, the drying in the heating furnace and which will not remain unevaporated, that is, which will not adversely affect the characteristic of the metal containing paint applied.

In the foregoing description, reference has been made to the use of the stainless steel powder as a constituent of the metal containing paint P. The stainless steel powder may be of a composition containing 13% by weight of nickel, 17% by weight of chromium, 2.5% by weight of molybdenum and 67.6% by weight of iron. However, the proportions of those four elements may not be limited to those described above, provided that those four elements, that is, nickel, chromium, molybdenum and iron, are contained in the requisite metal containing paint P in varying proportion with or without the addition of other elements in a small quantity. Alternatively, in place of the stainless steel powder, a powder of aluminum or any other suitable metal may be employed.

However, the use of either stainless steel or aluminum is preferred for the metal powder used in the metal containing paint utilizable in the practice of the present invention because it has been found that the application of the paint P containing a powder of either the stainless steel or aluminum has exhibited a satisfactory transformation into the black color, that is, has resulted in a high S/N ratio.

Where a powder of copper is employed in the metal containing paint utilizable in the practice of the present invention, it has been found that the solid paint layer applied to the envelope and containing the copper powder was blackened as the envelope had emerged from the heating furnace and before the laser beam was radiated. Considering this, it appears that the use of a powder of metal, such as copper, of the kind which tends to loose gloss is not recommendable because the metal of such kind tends to react with the paint matrix and/or the solvent used in the paint during the heat treatments and/or chemical treatments subjected to the cathode ray tube being manufactured, thereby loosing the glossiness.

With respect to the particles size of the metal particles used in the metal containing paint, it is preferred to be so small as they will not precipitate in the metal containing paint in a fluid state. For example, not greater than 40 micrometers is preferred for the average particle size of the metal powder.

Other than silicone resin, the matrix of the metal containing paint may be either methylphenyl silicone resin or a mixture of silicone resin with denatured silicone, both of which can withstand both of the heat treatment and the chemical treatment generally practiced during the manufacture of the cathode ray tube. An inorganic matrix, for example, ceramics such as glass of a low melting point generally used in the production of enameled ironwares, may also be used for the metal containing paint. However, where the low melting glass is employed, the amount of the laser beam radiated has to be higher than that required when the varnish of silicone resin is employed.

Although the present invention has fully been described in connection with the preferred embodiment thereof with reference to the accompanying drawings used only for the purpose of illustration, those skilled in the art will readily conceive numerous changes and modifications within the framework of obviousness upon the reading of the specification herein presented of the present invention. For example, it is well known that the process of making the cathode ray tubes includes a step of removing stresses built up in the envelope of the cathode ray tube. Since the envelope is made of glass, the removal of the stresses built up in the envelope is carried out by annealing the envelope at a temperature within the range of 400° to 500° C. Accordingly, this annealing temperature can be used to heat the layer of metal containing paint using the trichloroethane as the solvent and, therefore, the use of the heating furnace described and shown as used only for the purpose of drying the applied paint layer may be obviated, provided that the annealing step is provided intermediate between the paint applying station and the laser beam radiating station.

Accordingly, such changes and modifications are, unless they depart from the spirit and scope of the present invention as delivered from the claims annexed hereto, to be construed as included therein.

What is claimed is:

1. A method for forming an identifying indicia on a cathode ray tube comprising an envelope, which method comprises the steps of:

applying a paint containing a powdered metal, mixed in a matrix and a solvent, to a selected exterior surface portion of the envelope, said paint being of a nature capable of withstanding both heat treatment and chemical treatment generally practiced in the manufacture of the cathode ray tube;

drying the applied paint to form a solid paint layer; and radiating a laser beam, with the use of a laser beam radiator, onto a portion of the solid paint layer to form the identifying indicia represented by at least one trace of plasticized deformation on a surface region of the solid paint layer.

2. The method as claimed in claim 1, wherein the metal is selected from the group consisting of stainless steel and aluminum.

3. The method as claimed in claim 1, wherein the matrix is silicone resin.

4. The method as claimed in claim 1, wherein the drying step is carried out by passing the envelope, applied with the paint, through a heating furnace.

5. The method as claimed in claim 1, wherein the solvent is selected from the group consisting of trichloroethane, xylol, trol, butanol, toluene and a mixture thereof.

6. The method as claimed in claim 1, wherein the solvent is trichloroethane and the drying step is carried out for a length of time not shorter than 10 minutes at a temperature of not lower than 300° C. by passing the envelope, applied with the paint, through a heating furnace.

7. The method as claimed in claim 1, wherein the drying step is carried out by passing the envelope, applied with the paint, through an annealing furnace employed in the manufacture of the cathode ray tube for the removal of stresses built up in the envelop.

8. The method as claimed in claim 6, wherein the drying step is carried out by passing the envelope, applied with the paint, through an annealing furnace employed in the manufacture of the cathode ray tube for the removal of stresses built up in the envelope.

* * * * *